(12) United States Patent
Hall et al.

(10) Patent No.: US 6,401,076 B1
(45) Date of Patent: Jun. 4, 2002

(54) WIDE AREA INVENTORY CONTROL SYSTEM

(76) Inventors: Alfred E. Hall, 14943 Hillcrest Rd., Dallas, TX (US) 75248; Harold Levine, 6858 Meadowcreek, Dallas, TX (US) 75240

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/841,269

(22) Filed: Apr. 29, 1997

Related U.S. Application Data

(63) Continuation of application No. 08/361,867, filed on Dec. 22, 1994, now abandoned, which is a continuation of application No. 08/090,464, filed on Jul. 12, 1993, which is a continuation of application No. 07/679,815, filed on Apr. 1, 1991, which is a continuation of application No. 07/476,092, filed on Jan. 29, 1990, which is a continuation of application No. 07/146,844, filed on Apr. 27, 1988.

(51) Int. Cl.$^7$ ............................................. G06F 153/00
(52) U.S. Cl. ........................................... 705/22; 705/21
(58) Field of Search .......................... 705/22, 110, 28, 705/21, 23; 707/1, 10, 100; 340/825.27, 825.5; 233/379, 380, 385

(56) References Cited

U.S. PATENT DOCUMENTS

| | | | | | |
|---|---|---|---|---|---|
| 4,415,065 A | * | 11/1983 | Sandstedt | .................. | 364/401 |
| 4,473,824 A | * | 9/1984 | Claytor | .................. | 340/825.27 |
| 4,530,067 A | * | 7/1985 | Dorr | .......................... | 364/401 |
| 4,674,044 A | * | 6/1987 | Kalmus | ................ | 340/825.27 |
| 4,677,434 A | * | 6/1987 | Fascenda | ............... | 340/825.27 |
| 4,677,552 A | * | 6/1987 | Sibley | ........................ | 364/408 |
| 4,850,009 A | * | 7/1989 | Zook et al. | .................... | 379/96 |

FOREIGN PATENT DOCUMENTS

| | | | | | |
|---|---|---|---|---|---|
| JP | 54-127249 | | * | 10/1979 | |
| JP | 0037661 | | * | 3/1980 | ................ 364/401 |
| JP | 0097465 | | * | 5/1985 | ................ 364/401 |

OTHER PUBLICATIONS

Davis, Denis, "Casebook. (inventory management)", Chilton's Distribution, v84, p20(4), ISSN: 0273–6721, Dialog file 148, Accession No. 02335731, Jun. 1995.*

* cited by examiner

Primary Examiner—Frantzy Poinvil
(74) Attorney, Agent, or Firm—Harold Levine, P.C.

(57) ABSTRACT

An inventory control system in which local units having inventories continually and serially transmit data only in a local area to users having portable receivers which store and display when requested the inventory status of a particular item. The local units also transmit to a central computer their current inventory status so that additional local units may request inventory status in another local area from the central computer.

8 Claims, 4 Drawing Sheets

US 6,401,076 B1

WIDE AREA INVENTORY CONTROL SYSTEM

This application is a continuation of application Ser. No. 08/361,867, filed Dec. 22, 1994, now abandoned; which is a continuation, of application Ser. No. 08/090,464 filed Jul. 12, 1993, which is a continuation application of Ser. No. 07/679,815 filed Apr. 1, 1991, which is a continuation application of Ser. No. 07/476,092 filed Jan. 29, 1990, which is a continuation application of Ser. No. 07/146,844 filed Apr. 27, 1988.

BACKGROUND OF THE INVENTION

The present invention relates to an inventory control system wherein the local memory stores data representing the quantity of each of a plurality of commodities at a particular location with means coupled to the memory for entering data representing each addition or deletion of one of the commodities at the particular location and a transmitter coupled to the memory for continually broadcasting in serial form the stored data representing current inventory of each of the commodities. A hand held portable receiver receives the serially broadcast data and automatically and continually stores each of the commodity inventories represented by the serial data as,it,is received. display is included on the hand held receiver with means on the receiver coupled to the storage means and the display means for individually selecting stored data representing any one of the commodities and displaying it as available or unavailable.

The invention also relates to a wide area inventory control system comprising a plurality of local area systems forming the wide area system with each local area system having a computer with a memory for storing data signals representing the current inventory of each of a plurality of items on hand in that local area, a central computer having a memory with a storage area representing each local area for storing data representing current inventory of each item in each of the local areas and a high power transmitter coupled to each local area computer for broadcasting the current inventory data signals to the central computer for storage in the corresponding storage area. Each local area system includes means for transmitting a data request to the central computer for availability data on a selected item in other of the local areas and a high power transmitter is coupled to the central computer memory for transmitting the requested data to the requesting local area thereby advising the local area of the availability of the selected item from other local areas.

There is a great need in the present state of the art for an inventory control system which enables a rapid and accurate determination of the availability of the particular item or commodity in a particular situation. For instance, those looking for homes ordinarily obtain a realtor and give the realtor data on the type of home which they desire. The realtor then has a catalog or other documents available which lists homes in particular sections of the document according to the construction of the home. Thus those with swimming pools would be in one section, those with a particular number of bedrooms would be in another area, those in particular price ranges in another area, so forth. The realtor then reviews the sections of the catalog or other document attempting to find a home which would meet the requirements of the purchasers. It would be helpful for the realtor to have a local area computer having a memory in which the data concerning all homes available for sale was stored. It would be further helpful if the real estate agent had a portable hand held receiver into which he could enter through the keyboard, the data on the type of home his purchaser clients were seeking and have the address of that type of home appear on the display so that the realtor and his party could travel to the address to view the home. Such a system would require a local area transmitter coupled to the local area computer memory for continually transmitting the data on the various homes for sale in serial fashion. It would also require a keyboard input into the local area computer to add data on new homes for sale and delete data on homes that have been sold. Another use for such system would be in inventory control in retail system where the customer's request for a particular item could be entered into the hand held receiver with a code number representing a particular item and a display on the receiver for indicating whether or not the item is in stock in the local area.

Another advantageous feature of the present invention is to expand the local area concept to a wide area concept. Suppose for instance a particular retail item was not available in the local area. The local area could send a data request to a central computer which would store inventory data for a plurality of local areas and thus be able to determine if any of the other local areas have the product or item desired by the first area. If in fact such item is available in another local area, the central computer could the send a response to the data request to the first area indicating in which other local area such product is available.

Thus the most desirable feature of the present invention is to provide a memory in a portable receiver in which all inventory items are stored for review by the user who simply enters a code for the particular item and its presence or absence is indicated on the display. This type of memory is made practical by bubble memories or dynamic-ram or static-ram semiconductor memories with static-ram having the most desirable characteristics. The receiver unit is made practical by the extremely low data transmission rate (enhanced low band width, low error rate, and low power consumption) which the proposed use of a local memory permits.

SUMMARY OF THE INVENTION

Thus the present invention relates to a data storage and retrieval system comprising a local memory for storing data representing the number of each of a plurality of commodities available at a particular location, means coupled to the memory for entering data in the memory representing any addition of one of the commodities to the location, means coupled to the memory for entering data representing each deletion of any of the commodities from the locations so as to maintain a continual current inventory of each of the commodities, a transmitter coupled to the memory for continually broadcasting in serial form the stored data representing current inventory of each of the commodities, a hand held portable receiver for receiving the serially broadcast data, means in the receiver for automatically and continually storing each of the commodity inventories represented by the serial data as it is received, a display on the hand held receiver and means on the hand held receiver coupled to the storage means and the display means for individually selecting stored data representing any one of the commodities and displaying it as available or unavailable.

The invention also relates to a wide area inventory control system comprising a plurality of local area systems forming the wide area system, each local area system having a computer with a memory for storing data signals representing the current inventory of each of a plurality of items on hand in the local area, means coupled to each local area computer for adding data signals to and deleting data signals from the memory inventory to maintain a current inventory of each of the items, a low power transmitter coupled to the local area computer for serially and continually broadcasting only in the local area the data signals representing the current inventory of each of the items, a hand held, portable receiver for receiving the serially broadcast low power data signals, means in the receiver for automatically and continually storing each inventory item represented by the serially transmitted data signals, a display on the hand held receiver and means on the hand held receiver coupled to the storage means and the display means for individually selecting stored data signals representing any one of the items and displaying a selected item as available or unavailable.

BRIEF DESCRIPTION OF THE DRAWINGS

These and other objects of the instant invention may be had by referring to the following specification and drawings in which like numerals indicate like components and in which.

DESCRIPTION OF THE PREFERRED EMBODIMENT

Inventory items can be stored in the local area computer memory as well as the memory of the hand held receiver according to code. Thus code 1, for example, may indicate an automobile of a certain type and description, a home of a certain type and description, a particular style of shoe or other wearing apparel and the like. Thus such information can be continually transmitted by the local area transmitter from the local area memory in serial fashion to the hand held receivers for storage in the memory thereof. It should be understood that the local unit is the basic information handling unit. Thus it could be a warehouse, a department store, an automobile dealer office, a real estate office, and the like. It should also be understood that the central computer can be defined as a unit encompassing one or more local units such as, for example only, city wide, regional, state, country, or global. Thus "city wide" could include, for instance, all automobile dealers of a particular make for one city; "regional" could include all automobile dealers of a particular make in a state, "national" could include automobile dealers of a certain make in the United States and global could include all automobile dealers of a particular make in the world.

Figure 1:
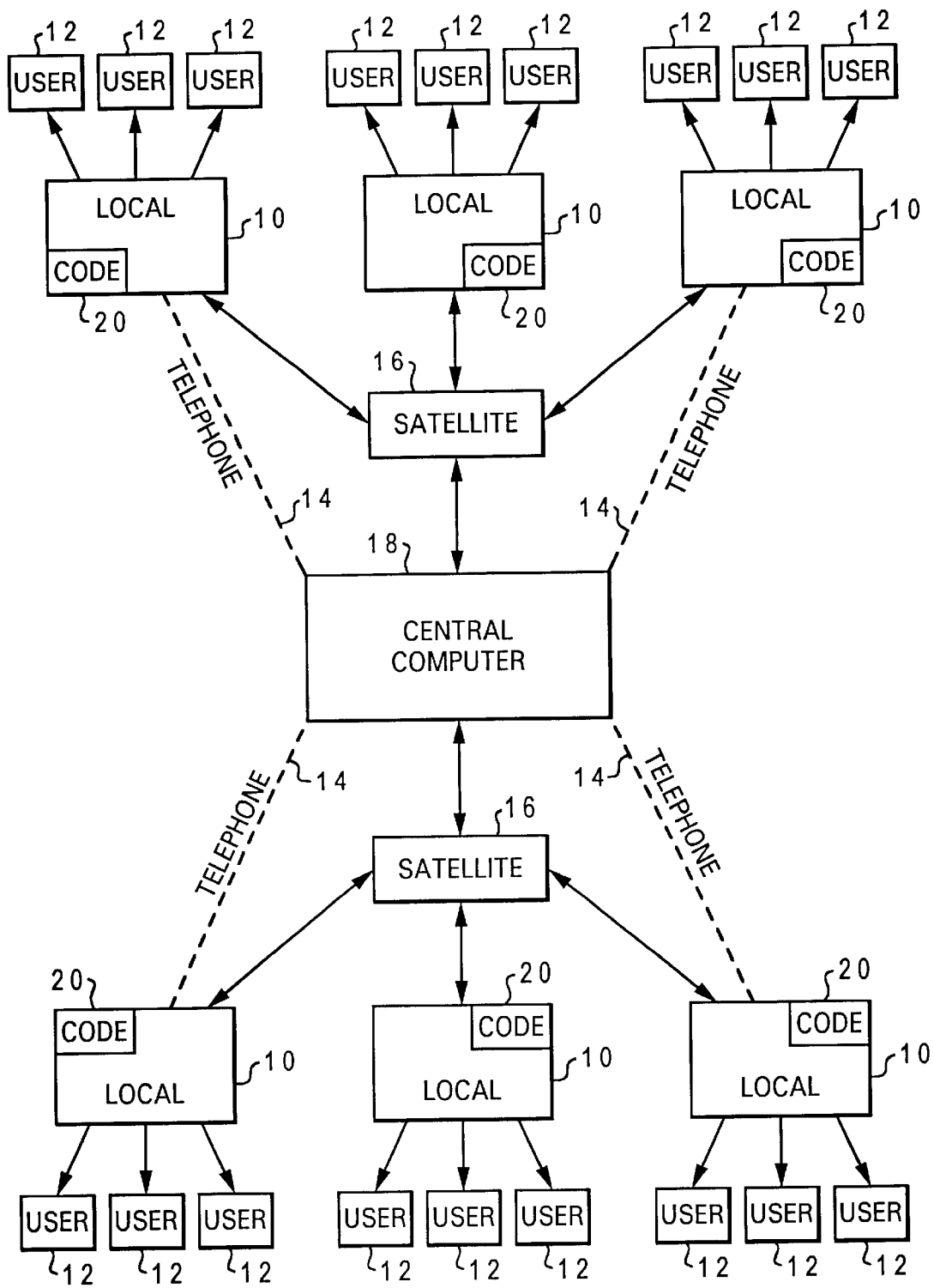
FIG. 1 is a schematic representation of a wide area inventory control system using satellite transmission or telephone lines.

Consider the generalized block diagram of the system as indicated in FIG. 1. A plurality of basic information handling units 10 such as computers with memories, also known as local units, maintain an inventory as will be described hereafter and serially and continually transmit the inventory information through a low power transmitter to users of the information having portable hand held receivers 12 where the information is stored in a memory in the portable hand held receiver. When the user desires to know if a particular item is in stock or inventory at the local unit 10, he simply enters a code through the keyboard of the receiver, shown in FIG. 4, and that code is accessed in memory and displayed to indicate whether or not the item is in stock. Thus the hand held receiver 12 has no ability to transmit but simply receives serial data continually from the local unit 10 representing the status of the inventory held by local unit 10 and stores that information in a memory in the portable hand held receiver 12. If there is no change in inventory obviously the information which is being transmitted does not change the status of the memory in the receiver 12. However if there has been a deletion, that information is stored under that code. If there is an addition of the same unit or additional units, the memory is updated accordingly in the portable receiver 12. Thus the user of the hand held receiver 12 actually has information on the entire inventory stored in the portable receiver 12 available from memory. He simply accesses the memory to determine whether or not a particular item is in stock.

If it should be that the particular item is not in stock, there may be an associated store or dealer in the same city or nearby area who may have one in stock. For that purpose, the local unit 10 transmits either through telephone lines 14 or satellite 16 a request to central computer 18 for that particular item and the central computer 18 can search its records for each of the local units 10 and send back information on the requested item. Thus each of the local units 10 is identified by a unique code 20 and continually and serially transmits its inventory information to the central computer 18 where it is stored in an area in memory for that particular local unit 10 by code. Thus if one local unit is designated as region 1 and another region 2 and another region 3, all of the information from local 1 would be stored in a memory area in central computer 18 designated for region 1. In like manner, the inventory data from local 2 would be stored in the memory area designated regional area 2 and so on.

Figure 2:
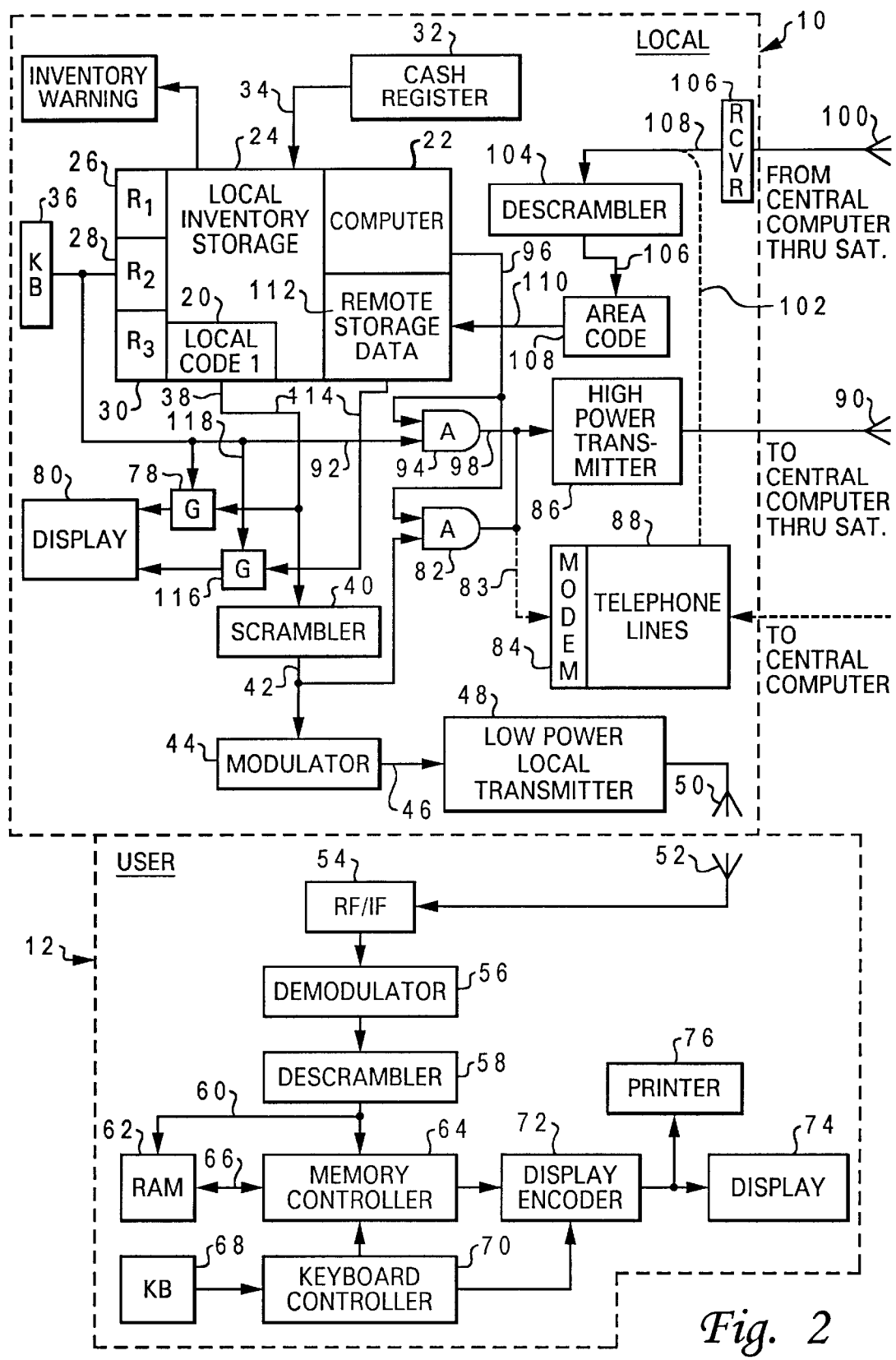
FIG. 2 is a schematic generalized broad diagram of the novel local area transmitter and the portable receiver.

Consider now FIG. 2 which is a schematic diagram of the local unit 10 and the portable receiver 12. Thus local unit 10 has a computer 22 with a memory 24 for storing the local inventory data. The local inventory storage may be subdivided into a plurality of sub-areas or locations 26, 28 and 30. For example only, if the local unit 10 represents automobile dealers, there may be three particular dealers in a local area with each of those dealers designated by the respective numerals 26, 28 and 30 as areas in the memory for storing the inventory data for the dealers. A cash register or other unit 32 may be utilized to enter data into the memory 24 whenever inventory is to be deleted. If the local unit 10 should happen to be a supermarket, for instance, the cash register could be so coupled to the memory that each time an item is sold information would be coupled on line 34 to the inventory storage 24 to delete the product sold from inventory. A keyboard 36 may also be used for the same purpose or to add inventory. Thus as new inventory is received, it could be entered into the local inventory memory 24 through the keyboard 36.

The output of local inventory storage 24 and data representing local code 20 is coupled serially on line 38 to a scrambler 40 so that the data would not be available to anyone who received it. The output of the scrambler 40 on line 42 is coupled to a modulator 44 which produces a signal on line 46 to modulate a local, low power transmitter 48. The output of the transmitter 48 is coupled to antenna 50 where it is radiated only in the local area. It is for that reason that the low power transmitter is used.

The receiver 12 has an antenna 52 which receives the serial, continually transmitted inventory data from low power transmitter 48 at the local unit 10 and couples that signal to an RF/IF circuit 54 the output of which is coupled to demodulator 56. There the signal is demodulated in a well-known manner to recover the inventory data which is descrambled by unit 58. That data is coupled through line 60 to random access memory storage unit 62 in a location determined by the memory controller 64 which produces signals on line 66 to random access memory 62. This storage may be accomplished in any well-known manner. For instance, each item in inventory may have its own particular code. For instance, relating to automobile dealers, the code 1 may represent a particular model, the code 1 2 may represent that model with two doors, the code 1 4 may represent that model with four doors, the code 1 2 5 may represent that model with a two door with air conditioning. Thus any particular desired coding may be used to identify a particular unit. A code of any desired length could be use to represent uniquely these inventory items. For instance, with a 12 bit code 4,096 unique 12 bit characters can be developed for inventory information. In addition, the 12 bit codes can be transmitted in groups with each group representing a particular item such as one 12 bit code for pick-ups, one 12 bit code for sedans and the like. The data transmission rate need not be extremely fast and if 24 bits are transmitted for each inventory item, a data transmission rate of 300 items per minute would represent 7,200 bits per minute or 120 bits per second. This data transmission rate is suited for transmission over channels of reasonable band width. Synchronizing characters in start-stop bits would add only a few bits per second to this number.

Thus, when the user of the receiver 12 desires to know if a particular item is in stock, he simply enters that information by code through keyboard 68 into a keyboard controller 70 which sends the necessary signals to the memory controller 64 to access the desired area of memory in RAM 62. This data is coupled through a display encoder 72 and the signals transformed into display signals which display the result on an LCD display 74. In addition, the information may also be printed on a small printer 76 attached to the portable hand held receiver 12.

As stated earlier, since the inventory is being received serially and continually from the local unit 10, and stored in the RAM 62, the user of the portable receiver 12 has a constant inventory update available at all times. The data received from local unit 10 can include and be encoded to designate data storage areas 26, 28 and 30 which are located in memory 24 of local unit 10. Thus if a particular automobile is in inventory only at one particular sub-location in the local area it may be designated in memory area 26 of memory 24 of local unit 10 and when that information is transmitted, it will so indicate on display 74 of the hand held portable receiver 12. The schematic details of the transmitter 48 and receiver 12 are old and well-known in the art and may be of the type disclosed in U.S. Pat. No. 4,473,824.

Any of the inventory data being transmitted from memory 24 in local unit 10 on line 38 may also be coupled to gate 78. If it is desired to view this information, the keyboard may enter a particular code and enable gate 78 to allow the data to pass through gate 78 and be displayed on display 80.

As indicated earlier, in order to be able to exchange inventory data with other local area units, the local unit 10 is continually transmitting data to a central computer 18 through either telephone lines 14 or a satellite system 16 (see FIG. 1). That is accomplished with computer 22 (see FIG. 2) providing an enable signal to and gate 82 which has as the other input the scrambled data on line 42 from scrambler 40. The output of and gate 82 is coupled either to a telephone modem 84 or to a high power transmitter 86. The output of the modem 84 is coupled to telephone lines 88 where the signal is transferred to the central computer. Thus the inventory data from local unit 10 is constantly and serially transmitted to the central computer 18 for storage. In like manner, the output of the high power transmitter 86 is coupled to an antenna 90 where the information is relayed to the central computer through a satellite system.

If it is assumed that a particular item is not in inventory in local unit 10, a data request may be made to the central computer to determine if the item is available in any other corresponding local unit. To this end, a signal would be entered into the system through keyboard 36 and coupled on line 92 as an enable signal to and gate 94. In addition, the computer 22 produces an output on line 96 as the other enable signal to and gate 94 which produces the data request output signal on line 98 which is again coupled to either the telephone modem 84 or to the high power transmitter 86 for transmission to the central computer 18.

The response from the central computer may be either through the satellite on antenna 100 or through the telephone lines 88 the output of which is coupled as shown by dashed line 102 to a descrambler 104. The input from the antenna 100, if the satellite system is used, is also coupled to a receiver 106 which produces an output on line 108 into the descrambler 104. The descrambler 104 decodes the information received and couples that information on line 105 to an area code decipher unit 108. If the information has the proper local area code for the particular local unit 10, a signal is produced on the output line 110 of area code decipher unit 108 and coupled into the remote data storage unit 112. That memory 112 can be accessed on line 114 by entering the necessary information through keyboard 36 into the computer 22. The output from memory 112 on line 114 is coupled to gate 116 where a second enable signal appears on line 118 from keyboard 36 and the information again is displayed on display unit 80.

Figure 3:
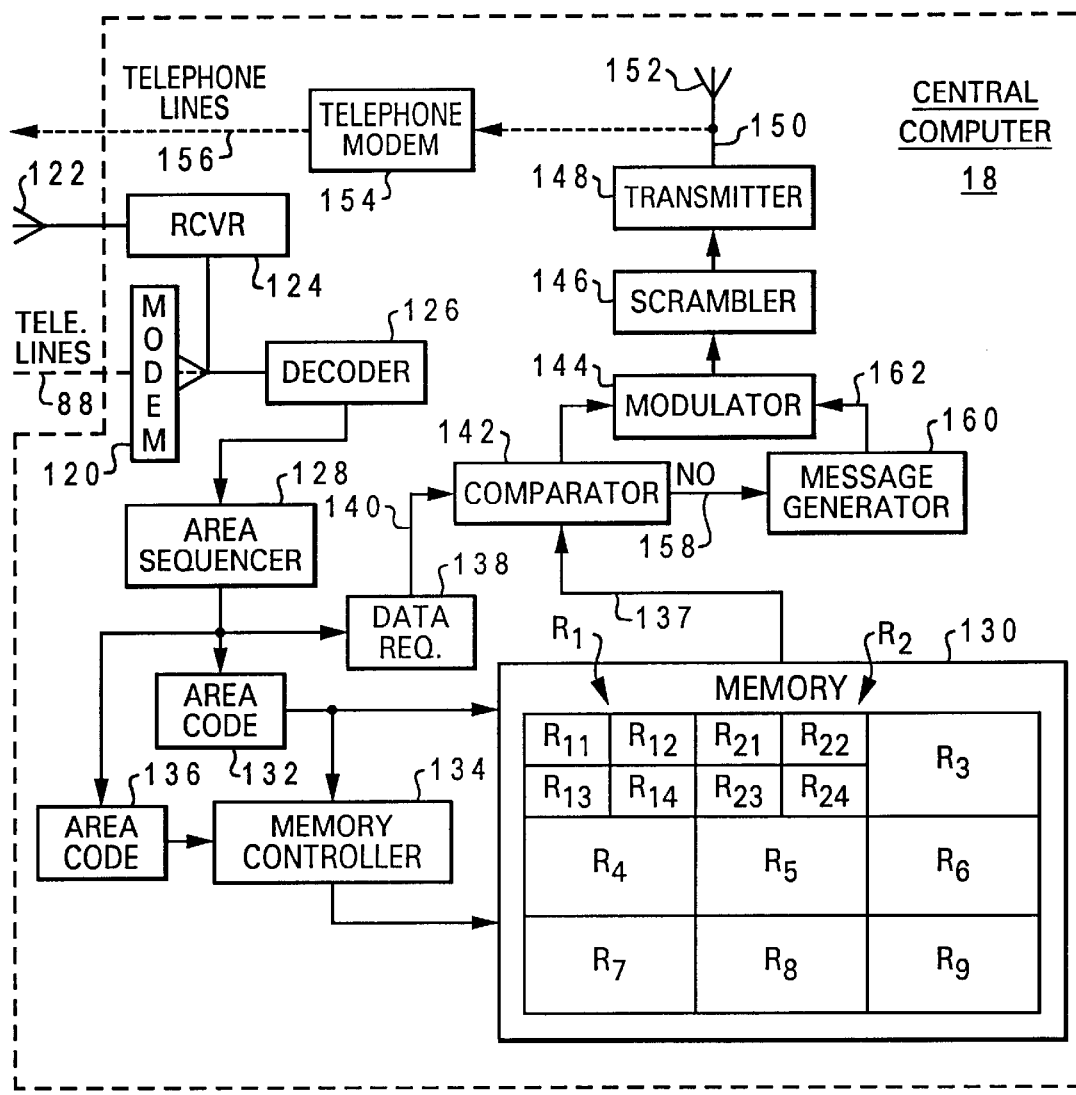
FIG. 3 is a generalized block diagram of the central computer.

Referring now to FIG. 3, a generalized block diagram of the central computer 18, it will be seen that the information from the local units 10 arrive on either telephone lines 88 to a modem 120 or through satellite antenna 122 to a receiver 124. That information is coupled through a decoder 126 to determine which unit is transmitting. Since more than one local unit is constantly transmitting inventory data, a local area sequencer 128 separates the incoming information by code as for instance in a memory queue where the data can be entered into memory 130 in that particular area in sequence. Area decoder 132 detects that code and determines where in memory the information should go. Memory controller 134 then controls the storage of the data in that particular area. If the information is to be stored and is inventory data, data storage unit 136 detects the proper codes and instructs the memory controller 134 to store the data accordingly. It will be noted that the memory 130 has several memory areas indicated by R1, R2, R3, R4, R5, R6, R7, R8 and R9 for examples only. In addition, areas R1 and R2 have been further subdivided. Memory area R1 has been subdivided into four particular units R11, R12, R13 and R14. In like manner, memory area R2 has been subdivided into memory units R21, R22, R23 and R24. The other memory units may be likewise subdivided.

When a request for inventory data is received, a data request unit 138 detects that request and generates a signal on line 140 to comparator 142. The comparator 142 receives information from memory 130 on line 137 and, if the requested inventory item is in storage, when a comparison is obtained, and the output is used to modulate a transmission signal in modulator 144. The signal is scrambled in a scrambler unit 146 which sends the scrambled signals to transmitter 148. The output of transmitter 148 on line 150 is coupled either to antenna 152 or to telephone modem 154 and to telephone lines 156 which are coupled back to the local units.

If comparator 142 finds that there is no such requested item in inventory in any of the local areas and stored in memory unit 130, comparator 142 generates an output on line 158 which is coupled to a message generator 160 which produces the message indicating that no inventory item as requested exists. This signal is coupled on line 162 to modulator 144 which again is scrambled by scrambler 146 and passes through transmitter 148 for transmission to the local unit that requested the data.

Figure 4:
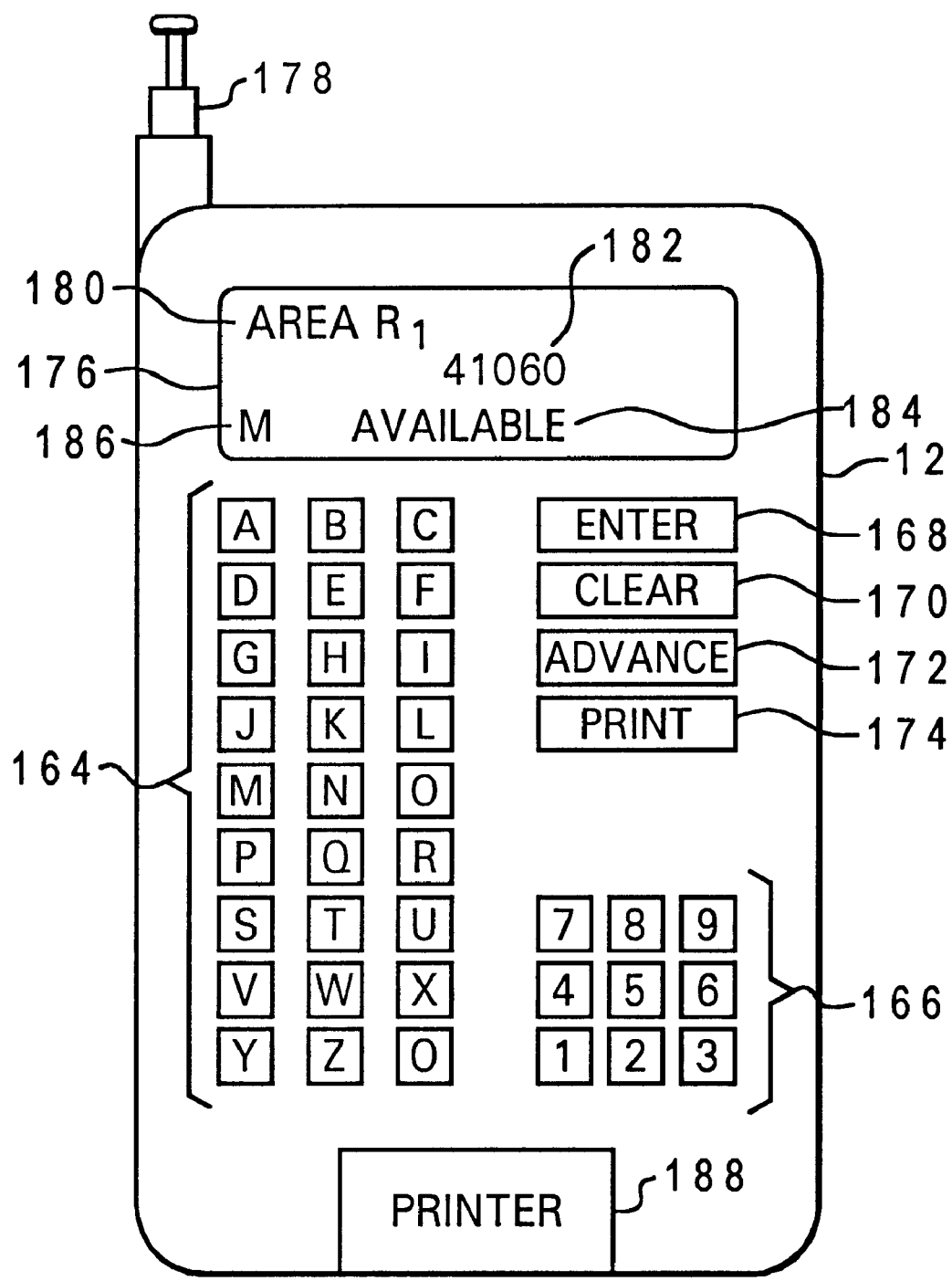
FIG. 4 is an illustrative view of the front of the novel hand held portable receiver.

The portable receiver 12 is illustrated in front view in FIG. 4. It includes alphabetical keys 164, numerical keys 166, enter key 168, clear key 170 advance key 172, a print key 174, an LCD display 176 and antenna 178.

The alphabetical keys 164 and numerical keys 166 may be used to enter the name or code of the item to be located in inventory. Thus the user may enter area R1 as indicated at 180 and then enter the code number of the item 41060 as indicated at 182. When the enter button 168 is depressed, the memory searches for the item represented by that code and if available so indicates at 184.

The clear key 170 may be used to clear any entry that is erroneously made. If the symbol M appears as indicated at 186 the user will be aware that more than one of the units are available. In that instance, the advance key 172 may be depressed to sequentially determine where each of the items are located. In addition, if the inventory item should be a home being sold by realtors, the address of each of the homes meeting that particular description would be sequentially shown on the screen whenever the advance button 172 is depressed. Print key 174 may be depressed whenever it is desired to obtain a print out of the inventory item indicated to be available on the screen 176 with printer 188.

Thus it is seen that the existence or non-existence of any item in inventory may be determined by entering through the keyboard the coded designation of the item by which the item is known.

Thus there has been disclosed a novel and unique inventory control system for both local and wide area use which utilizes a portable receiver which can be carried in the pocket and yet which keeps all of the inventory stored in its memory and is constantly and continuously updated with any inventory changes that may occur. In addition, warnings can be transmitted to the local unit whenever inventories are on the verge of being depleted so that they can be reordered or reordered or refilled. In addition, a central computer may keep track of all of the inventories of a plurality of local units and allow each local unit to obtain from the central computer inventory items in other local areas which may not be found in one particular area.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. A wide area inventory control system for determining the physical availability of tangible items ready for sale in existing inventory including quantity, specific location, and unit sales price, said system comprising:

a. a plurality of geographically separated local area systems forming said wide area system;

b. each local area system having a computer with a memory for storing data signals representing the current physically available quantity and location of each of a plurality of finished tangible items carried by said local area in ready-for-sale inventory and their exact sales prices;

c. means coupled to each local area computer for adding data signals to and deleting data signals from said memory to maintain a current data representing the physically available quantity, unit sales price and location of each of said finished tangible items carried in ready-for-sale inventory;

d. local area broadcasting transmitter means coupled to said local area computer for serially and continually broadcasting, only in said local area, said data signals representing said current data representing the physically available quantity, unit sales price and location of each of said finished tangible items carried in ready-for-sale inventory;

e. a hand held, portable receive-only receiver for continuously receiving said serially broadcast data signals;

f. storage means in said receiver for automatically and continually storing physical availability and location data for each of said finished tangible items represented by said serially transmitted data signals;

g. a display on said hand held receiver; and h. means on said hand hold receiver coupled to said storage means and said display for individually selecting stored data signals representing any one of said finished tangible items and displaying a selected item as available or unavailable in ready-for-sale inventory and the exact unit sales price thereof.

2. A wide area inventory system as in claim 1 further comprising:

a. a central computer having memory with a storage area representing each local area for storing data representing current physically available quantity, exact unit sales price and location of each finished tangible item carried in ready-for-sale inventory in each of said geographically separated local areas;

b. means coupled to said local area computer for broadcasting said current physically available quantity, exact unit sales price and location data signals to said central computer for storage in a corresponding storage area in said central computer area;

c. means in said local area system for transmitting a data request from a requester to said central computer for availability data on a selected finished tangible item then existing in ready-for-sale inventory in other of said local areas; and d. transmitter means coupled to said central computer memory for transmitting said requested data to said requesting local area so as to advise said local area of the availability of said selected finished tangible item then existing in ready-for-sale inventory from said other local areas.

3. A system as in claim 2 wherein said local area broadcasting means comprises a low power transmitter operating at a first frequency.

4. A system as in claim 3 wherein said means for broadcasting to said central computer comprises:

a. a high power transmitter coupled to said local area computer for receiving said current physically available quantity, price and location data signals and transmitting said signals at a second frequency different from said first frequency; and b. a satellite for receiving and transmitting said second frequency signals to said central computer for storage.

5. A system as in claim 3 wherein said means for broadcasting to said central computer comprises:

a. a modem coupled to said local area computer for receiving said current physically available quantity, price and location data signals; and b. telephone lines coupled between said modem and said central computer for carrying said current physically available quantity, price and location data signals to said central computer for storing and returning said availability data on a selected tangible item in other of said local areas.

6. A system as in claim 4 wherein said transmitter means coupled to said central computer further comprises a high power transmitter for transmitting said requested availability data, at said second frequency to said local area requester.

7. A system as in claim 6 further comprising;

a. multiple storage areas in said local computer memory, said multiple storage areas representing sub-locations of a particular location; and b. a first code representing a particular local area and a plurality of second codes, each second code representing a sub-location so that a combination of said first code and one of said second codes identifies the particular local area and sub-location of a selected tangible item.

8. A system as in claim 7 further including a warning circuit coupled to said local memory for generating a warning signal when a particular tangible item stored in local memory is reduced in quantity to a particular predetermined level.

* * * * *